(12) United States Patent
Batni et al.

(10) Patent No.: US 7,839,995 B2
(45) Date of Patent: Nov. 23, 2010

(54) CHANGE TO PLAYBACK CHARACTERISTIC OF RINGBACK TONE

(75) Inventors: Ramachendra P. Batni, Phoenix, AZ (US); Ranjan Sharma, New Albany, OH (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1120 days.

(21) Appl. No.: 11/045,706

(22) Filed: Jan. 28, 2005

(65) Prior Publication Data

US 2006/0182247 A1  Aug. 17, 2006

(51) Int. Cl.
*H04M 3/00* (2006.01)
(52) U.S. Cl. .................................. 379/418; 379/373.01
(58) Field of Classification Search ......... 379/188–200, 379/207.16
See application file for complete search history.

(56) References Cited

U.S. PATENT DOCUMENTS 4,577,067 A * 3/1986 Levy et al. ............. 379/101.01
2004/0120494 A1 * 6/2004 Jiang et al. ............. 379/210.01
2005/0207555 A1 * 9/2005 Lee et al. ............... 379/207.16
2006/0023862 A1 * 2/2006 Sutcliffe ..................... 379/257
2006/0072716 A1 * 4/2006 Pham ....................... 379/88.17
2006/0147012 A1 * 7/2006 Moody et al. ........... 379/207.16
2007/0123311 A1 * 5/2007 Kim et al. ................... 455/567

FOREIGN PATENT DOCUMENTS

EP         1113655 A2      7/2001
WO     WO 99/09731 A1     2/1999
WO     WO-2004/016015  *  2/2004

* cited by examiner

*Primary Examiner*—Fan Tsang
*Assistant Examiner*—Ibraham Sharifzada
(74) *Attorney, Agent, or Firm*—Carmen Patti Law Group, LLC

(57) ABSTRACT

A playback characteristic of a ringback tone, played to a calling communication device employed by a user for a call to a called communication device, is changed based on input from the user of the calling communication device.

20 Claims, 3 Drawing Sheets

CHANGE TO PLAYBACK CHARACTERISTIC OF RINGBACK TONE

CROSS-REFERENCE TO RELATED APPLICATIONS

This application contains subject matter that is related to the subject matter of the following applications, which are assigned to the same assignee as this application. The below-listed applications are hereby incorporated herein by reference in their entireties:

"FEEDBACK TO CALLING COMMUNICATION DEVICE ON CALL CONNECTED WITH INTELLIGENT NETWORK SIGNALING," by Batni et al., Ser. No. 10/683,969, filed Oct. 10, 2003;

"CALL CATEGORY FOR A CALL THAT TERMINATES AT ANNOUNCEMENT SERVER COMPONENT," by Beauford, Ser. No. 10/697,216, filed Sep. 30, 2003;

"SELECTION OF RINGBACK TONE INDICATIVE OF EMOTIONAL STATE THAT IS INPUT BY USER OF CALLED COMMUNICATION DEVICE," by Batni et al., Ser. No. 11/015,609, filed Dec. 17, 2004.

TECHNICAL FIELD

The invention relates generally to communication systems and more particularly to ringback tones.

BACKGROUND

Ringback tone service allows a user of a mobile phone to preselect feedback to be played to a user of a communication device that calls the mobile phone. For example, a calling party employs a calling communication device to place a call to a called communication device employed by a called party. The calling party hears a ringback tone preselected by the called party while waiting for the called party to answer. The feedback in one example comprises an announcement and/or tone. The feedback in a further example comprises a ringback tone or announcement followed by a ringback tone. The ringback tone service replaces a traditional ringing sound that the calling party hears before the called party answers the call with the ringback tone preselected by the user of the called party. The ringback tone service allows the called party to customize the ringing sound that the calling party hears upon calling the called party.

In known ringback tone systems, the ringback tone played to the calling party is a pre-determined recording selected by the called party. The ringback tone can only be changed by the called party and the calling party is not able to interact with the ringback tone service. If the ringback tone is a song that the calling party does not like, they are forced to listen to it until the called party answers. If the ringback tone is an important message and the calling party misses a portion of it, they are unable to replay the message.

Thus, a need exists for an increase in calling party user interaction with a ringback tone service.

SUMMARY

A calling party initiates a call to a called party. A playback of a ringback tone, pre-selected by the called party, is performed to the calling party while the calling party waits for the called party to answer the call. The calling party inputs a signal to cause a change to a characteristic of the playback of the ringback tone.

In one embodiment, there is provided a method for changing a playback characteristic of a ringback tone, played to a calling communication device employed by a user for a call to a called communication device, based on input from the user of the calling communication device.

In another embodiment, there is provided a method for: performing a playback of a ringback tone to a calling communication device through employment of a communication path to the calling communication device; and monitoring the communication path for input from a user of the calling communication device that corresponds to a selected change to a characteristic of the playback of the ringback tone to the calling communication device.

In yet another embodiment, there is provided a method for: monitoring a communication path for input, from a user of a calling communication device, that corresponds to a selected change to a playback of a ringback tone to the calling communication device through employment of the communication path; receiving input from the user of the calling communication device, through employment of the communication path, that corresponds to the selected change to the playback of the ringback tone to the calling communication device; and performing the selected change to the playback of the ringback tone based on the input from the user of the calling communication device.

DESCRIPTION OF THE DRAWINGS

Features of exemplary implementations of the invention will become apparent from the description, the claims, and the accompanying drawings in which:

DETAILED DESCRIPTION

Figure 1:
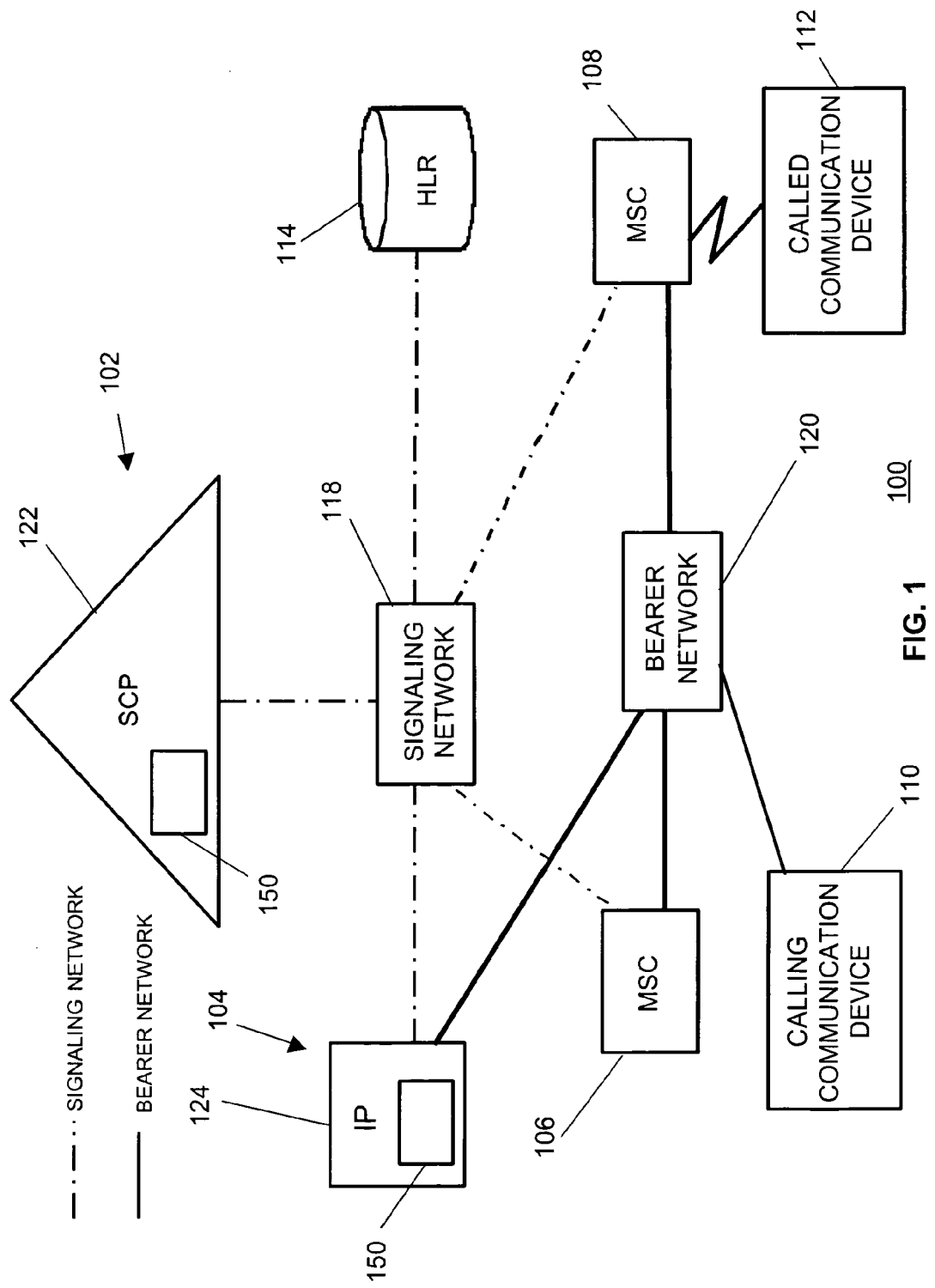
FIG. 1 is a representation of one implementation of an apparatus that comprises one or more intelligent network platforms, one or more mobile switching centers, a calling communication device, and a called communication device.

Turning to FIG. 1, an apparatus 100 provides a ringback tone service for wireless and/or wire-line telecommunication systems. The apparatus 100 in one embodiment comprises one or more intelligent network ("IN") platforms 102 and 104, one or more switching centers 106 and 108, a calling communication device 110, and a called communication device 112. In one example, the apparatus 100 further comprises a home location register ("HLR") 114 associated with the called communication device 112.

A signaling network 118 communicatively couples the intelligent network platforms 102 and 104, the switching centers 106 and 108, and the home location register 114. The signaling network 118 in one example comprises a signaling system 7 ("SS7") network that supports signaling traffic. A bearer network 120 communicatively couples the intelligent network platform 104 and the switching centers 106 and 108. The bearer network 120 in one example comprises a public switched telephone network ("PSTN") that supports bearer traffic.

The intelligent network platforms 102 and 104 comprise telephony network platforms. The intelligent network platforms 102 and 104 support intelligent network technology and standards. In one example, the intelligent network platforms 102 and 104 comprise wireless intelligent network ("WIN") platforms. In one example, the intelligent network platforms 102 and 104 comprise Customized Applications for Mobile network Enhanced Logic ("CAMEL") platforms. Exemplary embodiments of the intelligent network platforms 102 and 104 comprise one or more of a service control point ("SCP") 122 and an intelligent peripheral ("IP") 124. The intelligent network platforms 102 and 104 comprise an instance of a recordable data storage medium 150, as described herein.

The intelligent network platforms 102 and 104 may be combined into a single intelligent network platform or divided into a plurality of intelligent network platforms. The intelligent network platforms 102 and 104 serve to route calls, connect calls to communication devices, and perform a playback of ringback tones to the calling communication device 110 during a call from the calling communication 110 device for the called communication device 112. For example, the intelligent network platforms 102 and 104 serve to enable a ringback tone service. The intelligent network platforms 102 and 104 allow a user of the called communication device 112 to preselect one or more ringback tones to play to the calling communication device 110. The intelligent network platforms 102 and 104 allow a user of the calling communication device 110 to change one or more characteristics of the playback of the ringback tones. For example, the intelligent network platforms 102 and 104 change the characteristic of the playback of the ringback tone based on input from a user, as described herein.

In one example, the SCP 122 comprises service logic, American National Standards Institute ("ANSI-41") message handling logic, WIN message handling logic, and an SS7 interface. In another example, the SCP 122 comprises service logic, Global System for Mobile communications ("GSM") message handling logic, and Customized Applications for Mobile network Enhanced Logic message handling logic, and the SS7 interface. The SCP 122 in one example comprises a call controller and a data server. In one example, the call controller and the data server reside on a single SCP. In another example, the call controller and the data server reside on different SCPs. If the call controller and the data server reside on different SCPs, then the call controller queries the data server on the separate SCP for subscriber profile information and to determine what ringback tone to play at the calling communication device 110. The SCP 122 in one example provides instruction to the IP 124 to control the functionality of the IP 124. For example, the SCP 122 sends messages to the IP 124 to instruct the IP 124 to play the ringback tone to the calling communication device 110.

The SCP 122 in one example employs one or more of WIN, CAMEL, ANSI Capability Set 1 ("CS-1"), International Telecommunication Union ("ITU-T") CS-1, and session initiation protocol ("SIP") signaling to route calls that require the ringback tone service to the IP 124. An exemplary employment of WIN signaling is illustrated herein. For example, the SCP 122 receives WIN signaling relating to an incoming call at the switching center 106 for the called communication device 112 and sets parameters in WIN signaling messages to direct the incoming call to the IP 124. Therefore, the IP 124 can play the preselected ringback tone to the calling communication device 110. For example, the SCP 122 routes the incoming call to the IP 124, so the IP 124 may play the preselected ringback tone at the calling communication device 110 prior to connection of the call with the called communication device 112. To route the incoming call to the IP 124, the SCP 122 in one example sets a TerminationList parameter of a WIN signaling message to a directory number of the IP 124. Then, the SCP 122 sends the TerminationList parameter in the WIN signaling message to the switching center 106 that queried the SCP 122 on what action to take for the incoming call. Upon receipt of the WIN signaling message, the switching center 106 connects the call to the IP 124.

The intelligent network platforms 102 and 104 in one example employ WIN signaling, Integrated Services Digital Network User Part ("ISUP") signaling, and ANSI-41 signaling to enable the ringback tone service. The WIN signaling, ISUP signaling, and ANSI-41 signaling are in accordance with ANSI-41 standards. In one exemplary implementation, the signaling messages follow one or more of ANSI/TIA/EIA-41-D, TIA/EIA/IS-771, and TIA/EIA/IS-826 standards. Since the SCP 122 employs standard based WIN signaling to route the call from the calling communication device 110 to the IP 124, then other network components may be standards based network components. For example, the switching centers 106 and 108 and the HLR 114 comprise standards based network components. Therefore, the switching centers 106 and 108 and the HLR 114 do not require modifications to enable the ringback tone service.

In one example, the SCP 122 determines that one or more characteristics of an incoming call from the calling communication device 110 match one or more ringback tone selection criteria set up by the user of the called communication device 112. Therefore, the SCP 122 signals the switching center 106 to route the incoming call to the IP 124 to invoke the ringback tone service. If the incoming call matches the ringback tone selection criteria, then the IP 124 performs a playback of the preselected ringback tone to the calling communication device 110. The IP 124 plays the ringback tone to the calling communication device 110 between receipt of the call from the calling communication device 110 and answer of the call by the called communication device 112. In one example, the IP 124 stores the available ringback tones. In another example, the IP 124 accesses a storage component that stores the available ringback tones.

In another example, the one or more characteristics of the incoming call do not match the one or more ringback tone selection criteria. In this case, the SCP 122 can either signal the switching center 106 to route the incoming call to the IP 124 to invoke a Default ringback tone to be played to the calling communication device 110, or alternatively respond with a Continue message to have the switching center 106 play the normal ringback tone to the calling communication device 110.

The switching centers 106 and 108 are associated with the called communication device 112. The switching centers 106 and 108 in one example support mobile telecommunication devices, for example, the communication devices 110 and 112. For example, the switching centers 106 and 108 comprise mobile switching centers ("MSCs"). The switching centers 106 and 108 in one example comprise an originating mobile switching center ("O-MSC") 106 and a serving mobile switching center ("S-MSC") 108. For example, the O-MSC 106 supports a home area of the called communication device 112 and the S-MSC 108 supports the called communication device 112 if the called communication device 112 moves to a roaming area. If the called communication device 112 is within the home area supported by the O-MSC 106, then the S-MSC 108 may not be in the call path between the calling communication device 110 and the called communication device 112. For example, the O-MSC 106 would also serve as a S-MSC for the called communication device 112. In another embodiment of the apparatus 100, the switching center 106 comprises a Service Switching Point or central office of the public switched telephone network.

Figure 2:
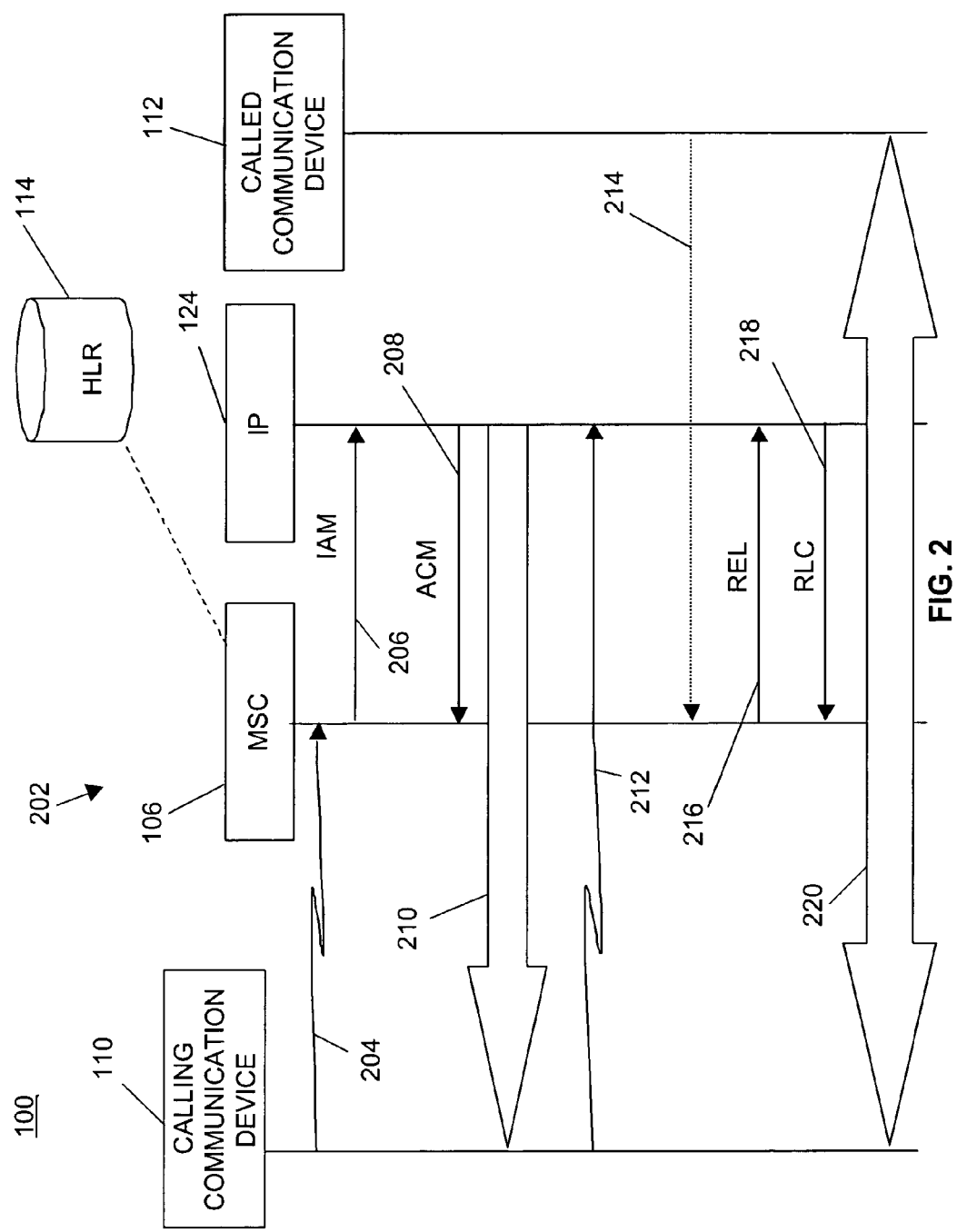
FIG. 2 is a representation of one exemplary message flow for changing a characteristic of a playback of a ringback tone of the apparatus of FIG. 1.
Figure 3:
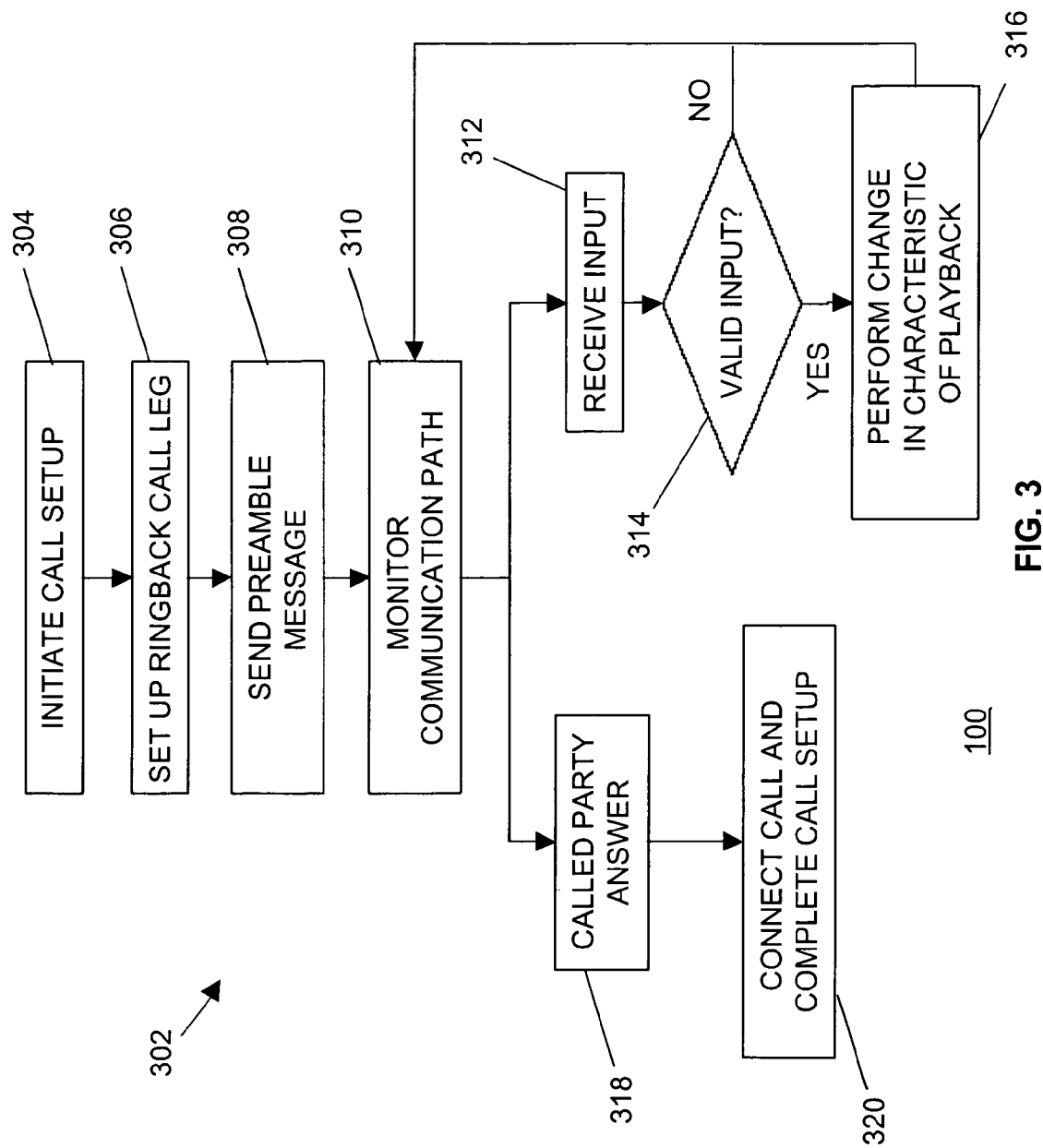
FIG. 3 is a representation of one exemplary logic flow for changing the characteristic of the playback of the ringback tone of the apparatus of FIG. 1.

Referring to FIGS. 1-3, an illustrative description of one exemplary operation of the apparatus 100 is presented, for explanatory purposes. A message flow 202 and a logic flow 302 describe an exemplary operation of the apparatus 100. A user of the calling communication device 110 (i.e., a calling party) initiates a call to a user of the called communication device 112 (i.e., a called party). The calling communication device sends a call setup request 204 through the bearer network 120 to the switching center 106. For example, an incoming call leg is routed to the O-MSC of the called communication device 112 by the public switched telephone network, as will be understood by those skilled in the art.

The switching center 106 initiates (STEP 304) a call setup for the call. During the call setup, the switching center 106 cooperates with the home location register 114 and/or the SCP 122 to determine that a ringback service should be provided for the call to the called communication device 112. The home location register 114 in one example selects an IP 124. The switching center 106 sends a call setup message 206 to the IP 124 to establish a communication path 210 between the calling communication device 110 and the IP 124. The call setup message 206 in one example comprises an initial address message ("IAM"). The initial address message comprises a plurality of parameters, for example, a calling party number, a redirecting number, and a called party number. The switching center 106 sets the calling party number to a directory number that corresponds to the calling communication device 110. The switching center 106 sets the redirecting number to a mobile directory number that corresponds to the called communication device 112. The switching center 106 sets the called party number to a routing number that corresponds to the IP 124, as will be appreciated by those skilled in the art.

The IP 124 receives the call setup message and allocates resources for the ringback call leg (STEP 306). The IP 124 sends a confirmation message 208 to the switching center 106 to create a call leg between the switching center 106 and the IP 124 over the bearer network 120, for example, a ringback call leg. The confirmation message 208 in one example comprises an address complete message ("ACM"). Upon receipt of the confirmation message 208, the switching center 106 connects the incoming call leg with the ringback call leg to establish the communication path 210. Upon establishment of the communication path 210, the IP 124 in one example begins playback of a pre-determined ringback tone to the calling communication device 110.

While the IP 124 performs the playback of the ringback tone to the calling communication device 106, the IP 124 monitors (STEP 310) the communication path 210 for input from the user of the calling communication device 110. The input from the user of the calling communication device, for example, an input 212, is received by the switching center 106. The switching center 106 forwards the input 212 over the communication path 210 to the IP 124. Exemplary inputs 212 from the user of the calling communication device 110 in one embodiment comprise dual tone multi frequency (DTMF) signals. For example, the user of the calling communication device 110 presses a button on a keypad of the calling communication device 110. In another embodiment, the input 212 comprises a voice signal. For example, the IP 124 employs speech recognition for interpreting spoken commands from the user of the calling communication device 110, as will be appreciated by those skilled in the art.

Upon receipt of the input 212 (STEP 312), the IP 124 determines if the input 212 corresponds to a pre-determined change to the playback of the ringback tone. For example, the IP 124 determines if the input is valid (STEP 314). If the input is not valid, the IP 124 ignores the input and returns to STEP 310. If the input is valid, the IP 124 performs (STEP 316) the pre-determined change to the characteristic of the playback and returns to STEP 310. For example, the calling party can make multiple changes to the ringback tone. The IP 124 in one example performs the change to the characteristic of the playback during the playback. For example, the IP 124 performs the change to the characteristic during the call setup. In a further example, the IP 124 performs the changes only during the call setup. In one embodiment, a table and/or set of valid inputs and corresponding changes is maintained by a service provider that operates the IP 124, for example, in a configuration file. In a further embodiment, the user of the called communication device 112 maintains and/or alters the table of valid inputs. In one embodiment, a single input corresponds to a change to a plurality of characteristics of the playback.

Exemplary characteristics of the playback of the ringback tone comprise volume and content. The volume in one example can be increased, decreased, muted, and/or unmuted. In another example, the content of the ringback tone is changed. Where the ringback tone comprises a song, a change in content in one example comprises a pause, stop, rewind, and/or fast-forward of the song. In another example, the change in content comprises a change in the song. For example, the IP 124 shuffles through a plurality of songs and/or ringback tones of a playlist, as will be appreciated by those skilled in the art.

In a further embodiment, the IP 124 sends (STEP 308) a preamble message to the calling communication device 110 before the playback of the pre-determined ringback tone. The preamble message comprises an indication of one or more associations between pre-determined changes to characteristics of the playback of the ringback tone and pre-determined inputs. For example, the preamble message informs the user of the calling communication device 110 which inputs are valid. In one example, an input of "7" is associated with an increase in volume and an input of "4" is associated with pausing the playback of the ringback tone. In another example, the user of the calling communication device 110 uses a spoken word and/or phrase as an input, for example, "Increase volume" to increase the volume and "Stop" to stop the playback. Other inputs and characteristics of the playback will be readily apparent to those skilled in the art.

The switching center 106 performs call processing to create a call leg between the switching center 106 and the called communication device 112, for example, an outgoing call leg. In one embodiment, the switching center 106 performs the call processing in parallel with the ringback service. When the user of the called communication device 112 answers the incoming call, the called communication device 112 sends a connect message 214 to the switching center 106. Upon receipt of the connect message 214 (STEP 318), the switching center 106 disconnects the ringback call leg and connects (STEP 320) the incoming call leg with the outgoing call leg. For example, the switching center 106 creates a communication path 220 between the calling communication device 110 and the called communication device 112 that allows voice communication between the calling party and the called party.

Upon a connection of the incoming call leg with the outgoing call leg, the call setup of the call is complete and the switching center 106 and the IP 124 perform a teardown of the ringback call leg. The switching center 106 sends a release message 216, for example, an REL message, to the IP 124. The IP 124 releases resources associated with the ringback call leg and sends a release confirmation message 218 to the switching center 106, for example, an RLC message. The switching center 106 and the IP 124 in one example perform the teardown of the ringback call leg in parallel with the voice communication between the calling party and the called party, as will be understood by those skilled in the art.

Referring to FIG. 3, one or more steps of the logic flow 302 may occur in parallel. For example, a first software thread that performs STEPS 312, 314, and 316 may execute in parallel with a second software thread that performs STEPS 318 and 320. In one example, the second software thread has a higher priority. For example, processing of user input stops once the call has been answered so that the call can be connected. In another example, the first software thread is interrupted upon the receipt of the REL message 216 and the user input processing is abandoned, as will be appreciated by those skilled in the art.

Numerous alternative embodiments of the present invention exist. For example, the intelligent network platforms 102 and 104, the switching centers 106 and 108, the calling communication device 110, the called communication device 112, and/or the home location register 114 may support alternate signaling protocols, standards, and/or platforms. Exemplary alternatives comprise signaling system 7, wireless intelligent network, Customized Applications for Mobile network Enhanced Logic, ANSI-41, GSM, Universal Mobile Telecommunications System, European Telecommunication Standards Institute ("ETSI") signaling, Advanced Intelligent Network ("AIN") signaling, and others. Alternate configurations of the intelligent network platforms 102 and 104 and the switching centers 106 and 108 may be implemented. Functionality of the intelligent network platforms 102 and 104 and the switching centers 106 and 108 may be shared by one or more components. For example, call processing functionality of the switching centers 106 and/or 108 may be performed by the intelligent network platforms 102 and/or 104, as will be appreciated by those skilled in the art.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise the recordable data storage medium 150 of the intelligent network platforms 102 and 104. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method, comprising the step of:
  receiving an initial address message (IAM), for a call from a calling communication device to a called communication device, from a mobile switching center associated with the called communication device, wherein the call is routed by a service control point to an intelligent peripheral that receives the initial address message;
  sending an address complete message (ACM) to the mobile switching center to create a communication path to the calling communication device during a call setup for the call;
  performing a playback of a ringback tone by the intelligent peripheral to the calling communication device through employment of the communication path to the calling communication device during the call setup for the call;
  monitoring the communication path for input from the user of the calling communication device during the call setup for the call and during the playback of the ringback tone;
  changing a playback characteristic of the ringback tone by the intelligent peripheral based on the input from the user of the calling communication device during the call setup for the call and during the playback of the ringback tone.

2. The method of claim 1, further comprising the step of:
  receiving the input from the user of the calling communication device.

3. The method of claim 2, wherein the step of receiving the input from the user of the calling communication device comprises the step of:
  receiving a Dual Tone Multi Frequency (DTMF) signal or voice signal from the calling communication device that corresponds to a selected change to the playback characteristic of the ringback tone;
  the method further comprising the step of:
  performing the selected change to the playback characteristic of the ringback tone.

4. The method of claim 2, wherein the step of receiving the input from the user of the calling communication device comprises the step of:
  receiving input from the user of the calling communication device that corresponds to a selected change of a set of changes that are pre-determined by a user of the called communication device;
  the method further comprising the step of:
  performing the one change to the playback characteristic of the ringback tone.

5. The method of claim 1, wherein the step of changing the playback characteristic of the ringback tone comprises the step of:
  changing a volume level or content of the ringback tone.

6. The method of claim 1, wherein the step of changing the playback characteristic of the ringback tone comprises the step of
  changing a plurality of playback characteristics based on the input from the user of the calling communication device, wherein the plurality of playback characteristics comprise the playback characteristic.

7. The method of claim 1, further comprising the step of:
  sending a message to the calling communication device to indicate to the user one or more associations between a pre-determined change to a playback characteristic and a pre-determined input.

8. The method of claim 7, wherein the step of sending the message to the calling communication device comprises the step of:
sending a first message that indicates one or more of:
a first DTMF or voice signal corresponds to an increase in volume of playback of the ringback tone;
a second DTMF or voice signal corresponds to a decrease in volume of playback of the ringback tone;
a third DTMF or voice signal corresponds to a pause in playback of the ringback tone;
a fourth DTMF or voice signal corresponds to a change in ringback tone.

9. The method of claim 1, wherein the step of changing the playback characteristic of the ringback tone comprises the step of:
changing the playback characteristic of the ringback tone only during the call setup for the call to the called communication device.

10. A method, comprising the steps of:
receiving an initial address message, for a call from the calling communication device to a called communication device, from a switching center associated with the called communication device, wherein the call is routed by a service control point to an intelligent peripheral that receives the initial address message;
sending an address complete message to the switching center to create the communication path to the calling communication device;
performing a playback of a ringback tone to the calling communication device by the intelligent peripheral through employment of a communication path to the calling communication device during a call setup for the call; and
monitoring the communication path during the call setup for the call and during the playback of the ringback tone by the intelligent peripheral for input from a user of the calling communication device that corresponds to a selected change to a characteristic of the playback of the ringback tone to the calling communication device;
receiving input during the call setup for the call and during the playback of the ringback tone from the user of the calling communication device through employment of the communication path; and
changing the characteristic of the playback of the ringback tone during the call setup for the call and during the playback of the ringback tone based on the input from the user of the calling communication device.

11. The method of claim 10, wherein the step of changing the characteristic of the playback of the ringback tone based on the input from the user of the calling communication device comprises the step of:
changing the characteristic of the playback of the ringback tone during the playback of the ringback tone.

12. The method of claim 10, wherein the step of changing the characteristic of the playback of the ringback tone based on the input from the user of the calling communication device comprises the step of:
changing a volume of the playback of the ringback tone.

13. The method of claim 10, wherein the step of changing the characteristic of the playback of the ringback tone based on the input from the user of the calling communication device comprises the step of:
performing a pause, stop, rewind, fast-forward, or shuffle of the ringback tone.

14. The method of claim 10, further comprising the step of:
sending a message to the calling communication device to indicate to the user one or more associations between a pre-determined change to a characteristic of the playback and a pre-determined input.

15. The method of claim 10, wherein the step of monitoring the communication path for the input from the user of the calling communication device comprises the step of:
monitoring the communication path for input that corresponds to a selected change to a characteristic of the playback of the ringback tone;
wherein the step of changing the characteristic of the playback of the ringback tone based on the input from the user of the calling communication device comprises the step of:
performing the selected change to the characteristic of the playback of the ringback tone.

16. The method of claim 10, wherein the step of monitoring the communication path for the input from the user of the calling communication device comprises the step of:
monitoring the communication path for one or more DTMF or voice signals from the calling communication device.

17. The method of claim 10, wherein the step of performing the playback of the ringback tone to the calling communication device through employment of the communication path to the calling communication device comprises the step of:
performing a playback of the ringback tone to the calling communication device during the call setup for a call placed from the calling communication device;
wherein the step of monitoring the communication path for input from the user of the calling communication device comprises the step of:
monitoring the communication path for input from the user of the calling communication device during the call setup for the call placed from the calling communication device.

18. A method, comprising the steps of:
performing a playback of a ringback tone, by an intelligent peripheral, to a calling communication device during a call setup for a call placed from the calling communication device;
monitoring a communication path to the calling communication device during the call setup for the call and during the playback of the ringback tone, by the intelligent peripheral, for input from a user of the calling communication device, wherein the input corresponds to a selected change to the playback of the ringback tone to the calling communication device through employment of the communication path;
receiving input from the user of the calling communication device during the call setup for the call and during the playback of the ringback tone, through employment of the communication path, that corresponds to the selected change to the playback of the ringback tone to the calling communication device; and
performing the selected change to the playback of the ringback tone during the call setup for the call and during the playback of the ringback tone based on the input from the user of the calling communication device.

19. The method of claim 18, further comprising the step of sending a message to the calling communication device to indicate to the user one or more associations between a pre-determined change to a characteristic of the playback of the ringback tone and a pre-determined input.

20. The method of claim 19, wherein the step of monitoring the communication path for the input comprises the step of:
monitoring the communication path for one or more DTMF or voice signals from the calling communication device.

* * * * *